May 18, 1948. S. DI RENZO 2,441,872
COMBINATION TANK CAP AND SIGNALLING DEVICE FOR GASOLINE TANKS
Filed March 28, 1947 2 Sheets-Sheet 1
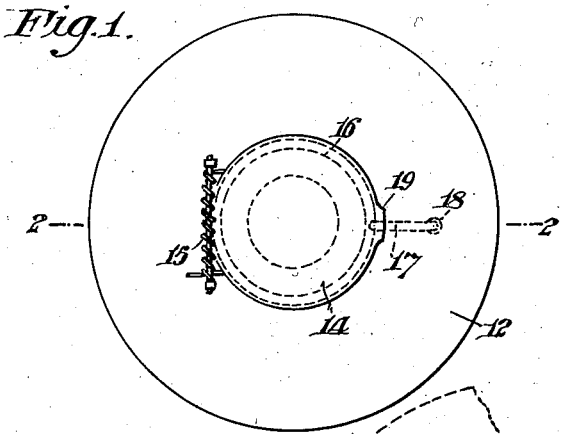
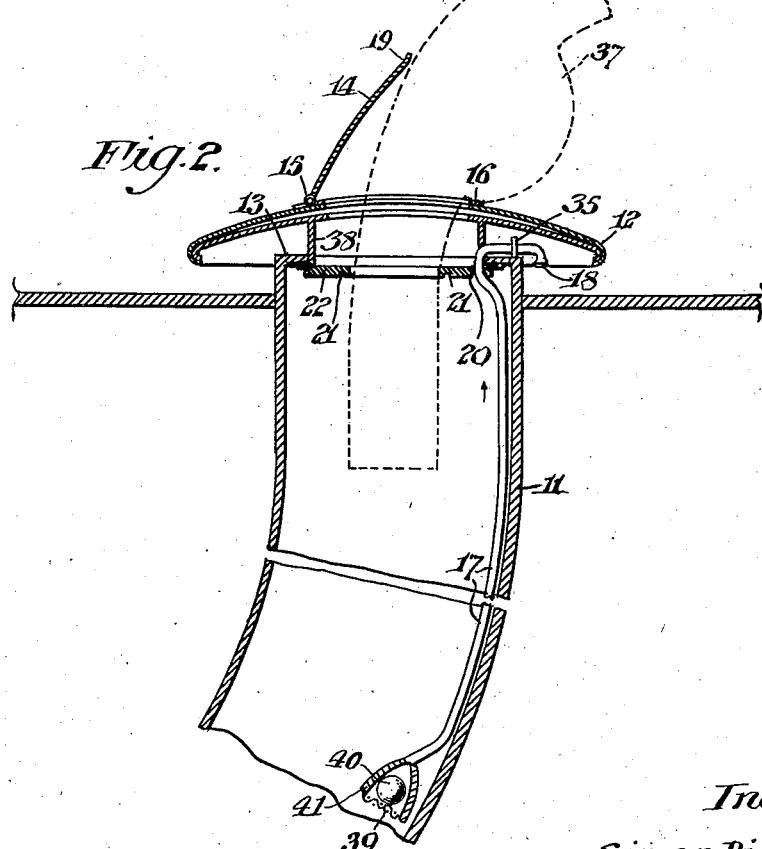
Inventor:
Simon Di Renzo,
By Jno. P. Croasdale
Attorney.

May 18, 1948.  S. DI RENZO  2,441,872
COMBINATION TANK CAP AND SIGNALLING DEVICE FOR GASOLINE TANKS
Filed March 28, 1947  2 Sheets-Sheet 2
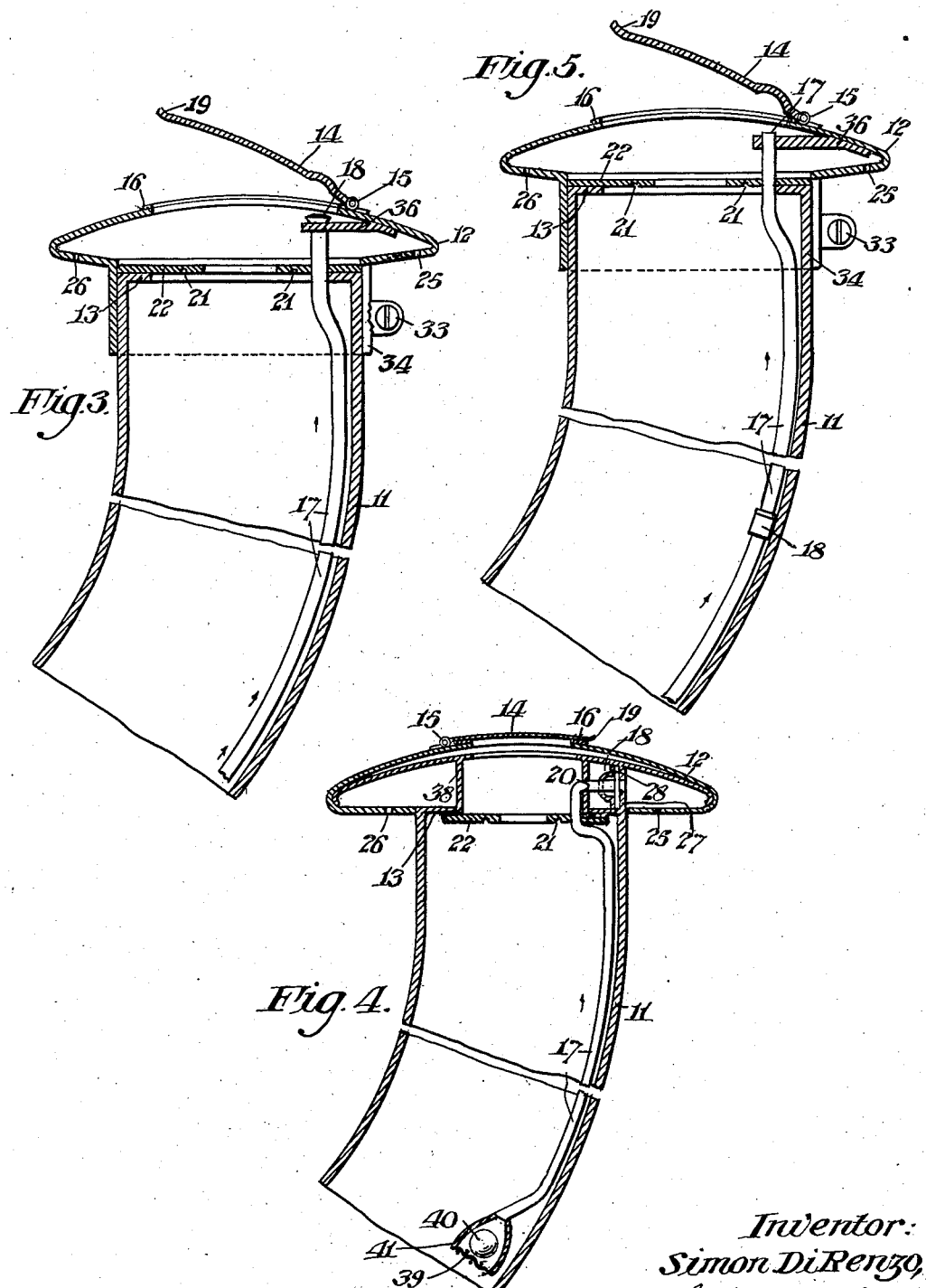
Inventor:
Simon Di Renzo,
By *Attorney*

UNITED STATES PATENT OFFICE

2,441,872

COMBINATION TANK CAP AND SIGNALLING DEVICE FOR GASOLINE TANKS

Simon Di Renzo, Philadelphia, Pa., assignor of one-third to Adolph A. Steinle and one-third to John J. McDevitt, both of Philadelphia, Pa.

Application March 28, 1947, Serial No. 737,935

3 Claims. (Cl. 116—109)

My invention relates to a device in combination with a gasoline tank cap, for preventing the overflow of gasoline from the tank in the process of filling the tank.

During normal conditions when no restrictions are placed upon gasoline, it is common practice to have the tank on automobiles completely filled with gasoline each time refueling is necessary. Usually the tank fills up so rapidly towards the final stage of filling that the station attendant consumes time in running small quantities into the tank in spurts and then looking to see the level of the gas in the tank filling pipe. Very frequently in spite of this precaution, the gasoline overflows from the tank and spills over the fender of the automobile and onto the ground. This results first in wasted gasoline for which the consumer pays and secondly in injury to the finish on the automobile. The spilled gasoline is injurious to the enamel on the car and it removes protective wax finish which is applied by most car owners for finish protection. In addition it causes discoloration and streaks on the fender thus marring appearance of newly cleaned cars.

Some automobiles have been designed with the gasoline tank filling opening located beneath the fender and accessible through a small hatch on the fender. This design recognizes the undesirability of gasoline overflowing onto the fender and avoids it by causing the overflow to spill directly on the ground. This, however, is only a partial answer since the car owner pays for the spilled gasoline which is usually greater than the amount visibly spilled on the ground.

During the summer especially, heat causes expansion of the gasoline within the tanks and when filled to overflowing it continues to overflow for long periods of time and it is not unusual to lose a full gallon of gasoline as a result of the initial overflow and subsequent expansion due to heat, particularly if the car is parked for an indefinite period immediately after filling the tank.

This continuing overflow also causes serious fire hazards when the car is parked in a garage immediately after filling the tank with gas.

It is the purpose of this invention to prevent the overflow of gasoline from the tanks of automobiles during the process of filling them by providing an audible signalling device which indicates when a safe level has been reached in filling the tank and which obviates the use of or need for specially constructed tanks.

Referring to the drawings, which illustrate merely by way of example suitable means for the embodiment of my invention;

Fig. 1 is a top plan view.

Fig. 2 is a vertical section on line 2—2 of Fig. 1.

Figs. 3, 4 and 5 are sectional views similar to Fig. 2, with modifications.

Similar numerals refer to similar parts throughout the several views.

The device in accordance with this invention operates upon the well known principle of the displacement of air when the level of a liquid rises in a container. The air displaced when filling the gasoline tank of an automobile is caused to actuate an indication device. Since there is normally an air vent for the escape of the displaced air this invention provides for an air seal around the gasoline hose nozzle so that a maximum of escaping displaced air will actuate said indicating device.

The tank has not been shown in order to secure larger views of the novel cap and associated parts. The body of the novel tank cap 12 permits of the convenient locking onto the gas tank opening by means of a locking flange bearing against the filling pipe shoulder 13 on the filling pipe or connection 11 of the fuel tank. The body of this tank-cap 12 is provided with an opening smaller than the opening of the usual filling opening of the gas tank filling pipe 11. This special opening is designed so that the standard filling station nozzle fits snugly and an air-tight seal is formed between the inserted nozzle and the gasket 22. This specially designed opening is provided with a spring-operated closure 14 which utilizes the gasket 16 in contact with the bottom surface of the closure 14 to form an air and liquid-tight joint when the closure covers the special opening. The coil spring 15 provides tension so that the closure 14 is always pressed against the gasket 16.

This method of closure affords another advantage in that it is not necessary to remove the tank cap when filling, thus preventing lost tank caps and spilled or evaporated gasoline because the filling hole is not closed.

It is only necessary to lift the closure 14 against the pressure of the spring 15 by means of the lip 19 provided on the closure. When the filling nozzle is inserted it will keep this closure open. When the nozzle is removed after filling, the closure 14 automatically snaps shunt.

Lost gasoline tank caps are a common occurrence due to forgetfulness on the part of the filling station attendant. This invention will eliminate this annoyance and loss.

The method of preventing overflow from the tank is as follows:

With the special gas tank top herein described, in place on the usual tank filling pipe 11, the small pipe 17 is positioned sufficiently down the neck of the tank opening to give continuous indication of the rising level of gasoline or other fluid until the level reaches the opening of this small pipe 17. As the level of fluid rises within the tank, the air which the fluid displaces must escape. This air is caused to escape through the small pipe 17 which has a whistle 18 connected to its end mounted on the outside of the special tank cap by means of the keeper 36. As long as the level of the liquid continues to rise within the tank the whistle 18 will continue to sound due to escaping air. When the level of the fluid has risen to the bottom of the small pipe 17 the opening of this pipe is sealed by the fluid and prevents the escape of air therefrom. The pipe 17 may also, if desired, have a valve chamber 41 on the lower end thereof, with a screen 39 covering the lower end of the chamber 41. A ball 43 of material capable of floating in gasoline may be provided in the chamber 41 to close the bottom of the pipe 17 when the level rises to that point and prevent the further escape of air therethrough. The whistle 18 ceases sounding and this indicates to the filling station attendant that the gas tank is filled to the safe point which prevents immediate overflow and subsequent overflow due to expansion.

The whistle 18 is shown in dotted lines in Fig. 1, and is more specifically shown in Fig. 2.

There is normally provided within gas tanks a small vent pipe for escaping air. Vent holes 25 and 26 are shown within the cap. By special design of the restricted opening in this gas tank cap provided by means of the air-tight fit between the filling nozzle and the gasket 22, all the escaping air (except that which escapes through the normal vent) is caused to escape through the pipe 17 and the indicating whistle 18.

Fig. 2 shows a specially designed gas tank cap incorporating an audible indicating device. This gas tank cap is made to fit the filling pipe of the present automobile gasoline tanks and provides an anti-overflow indicating device when used to replace the gas tank caps now in use.

In practice the small tube 17 will be made sufficiently long to be positioned within the gas tank filling pipe to the highest point it is desired to limit the gasoline level when filling the tank. An excess length of tubing will be provided so that this point can be individually adjusted for any make car by simply cutting the end of the tubing where desired.

The gas tank cap herein described fits the filling pipe of the gas tank in the usual manner by the engagement of the gas tank cap flange 38, with the gas tank filling pipe shoulder 13. The small tube 17 leads from the filling pipe 11, through the flange 38, through the hole 20 of the inner tank cap wall where it is brazed or soldered for support, and thence to the whistle 18, secured to the bottom wall of the main body 12, of the gas tank cap. The flange gasket 22, has upon its lower surface a narrow circumferential channel 21, which permits said gasket to flex more easily in the upward direction than in the downward direction. The inner diameter of the gasket 22, is somewhat smaller than the outer diameter of the standard gasoline station filling nozzle. When the gasoline station filling nozzle is inserted, the gasket 22 flexes inward, the walls of the circumferential channel 21, come together and close, permitting substantially the same pressure of the gasket 22 against the inserted nozzle as though the channel 21 were not present, thereby sealing the escape of displaced air at this point, causing the said displaced air to go through the tube 17, and actuate the whistle 18 when the tank is being filled.

When the whistle 18 ceases sounding the gasoline level has reached the bottom of the small tube 17 and sealed the escape of air. This indicates that the tank has been filled to the desired level. When the service station nozzle 37 is withdrawn the gasket 22 easily flexes in the upward direction at the point of least resistance which is the circumference of the channel 21 where the thickness of the gasket 22 is substantially less.

Fig. 3 is a modification wherein the indicating whistle 18 is supported by a bracket 36 below the top of the main body 12 of the gas cap.

It will be noted that the cover 14 in its normally closed position serves also to close and protect the whistle 18 by sealing against the cover gasket 16. It is necessary with this arrangement to provide means for venting the gasoline tank when the cover 14 is closed, since air cannot escape through the whistle 18 located beneath the cover. Such venting means are provided by the holes 25 and 26 located on the under side of the cap for protection against entry of foreign material and water.

Fig. 3 also shows a variation in the method of attaching the gas tank cap to the filling neck of the automobile gas tank. This is done by means of a split collar 34. After the gas tank cap is in place the split collar 34 can be tightened by the bolt 33. This method provides more permanent attachment of the cap to the tank.

Fig. 4 shows the usual method of attaching the cap to the tank by engagement of flange and shoulders 13 and 38. It will also be noted that the indicating whistle 18 is contained within the upper and lower walls of the gas cap main body 12. A resonant chamber is formed within the upper and lower walls by means of two internal partitions 27 and 28. The small tube 17 leads up through the flange 13, through the inner wall of the cap and into the resonant chamber or whistle 18 formed by the partitions 27 and 28. The holes 25 and 26 serve to vent the gasoline tank in normal operation. When the gasoline station nozzle 37 is inserted for filling the tank the gasket 22 seals the escape of air around the nozzle as explained before and since vent holes 25 and 26 are above the point of sealing the displaced air must escape through the small tube 17 and thence through the whistle 18 causing said whistle to sound when filling the gas tank. The advantages of this construction are first, the indicating whistle 18 is an integral part of the gas cap, and second, it is protected against damage and entry of water and foreign material.

Fig. 5 shows the provision of the whistle 18 near the bottom of the tube 17 in place of being at the top as shown in the other figures.

The operation of the device is illustrated in Figs. 2, 3 and 4.

This application is a continuation in part of my prior application for Anti-flow device for gasoline tanks, filed March 13, 1946, having Serial No. 654,189, now held abandoned.

What I claim is:

1. An article of manufacture comprising a cap having an opening therethrough, means for securing said cap to the filling connection of a tank, a movable closure member for permitting access to said opening, means for normally maintaining said closure member in closed position, an air venting tube in communication with the atmosphere carried by said cap and adapted to extend downwardly within said filling connection, an air pressure operated signal with which said tube is in communication, a gasket member for sealing said cap with respect to said filling connection, and a second gasket member comprising a flexible element in sealed engagement with said cap around said opening and having an aperture for snugly receiving a liquid delivery nozzle inserted therein, whereby said signal will be activated during filling of the tank and activation discontinued upon access of liquid to said venting tube.

2. An article of manufacture comprising a cap having an opening therethrough, means for securing said cap to the filling connection of a tank, a movable closure member for permitting access to said opening, means for normally maintaining said closure member in closed position, an air venting tube in communication with the atmosphere carried by said cap and adapted to extend downwardly within said filling connection, an air pressure operated signal with which said tube is in communication, a valve member on the lower portion of said tube adapted to be closed by liquid rising within said filling connection, a gasket member for sealing said cap with respect to said filling connection, and a second gasket member comprising a flexible element in sealed engagement with said cap around said opening and having an aperture for snugly receiving a liquid delivery nozzle inserted therein, whereby said signal will be activated during filling of the tank and activation discontinued upon access of liquid to said valve member.

3. An article of manufacture comprising a cap having an opening therethrough, means for securing said cap to the filling connection of a tank, a movable closure member for permitting access to said opening, means for normally maintaining said closure member in closed position, an air venting tube in communication with the atmosphere carried by said cap and adapted to extend downwardly within said filling connection, an air pressure operated signal at the upper end of said tube, a valve member at the lower end of said tube adapted to be closed by liquid rising within said filling connection, a gasket member for sealing said cap with respect to said filling connection, and a second gasket member comprising a flexible element in sealed engagement with said cap around said opening and having an aperture for snugly receiving a liquid delivery nozzle inserted therein, whereby said signal will be activated during filling of the tank and activation discontinued upon access of liquid to said valve member.

SIMON DI RENZO.

REFERENCES CITED

The following references are of record in the file of this patent:

UNITED STATES PATENTS

| Number | Name | Date |
|---|---|---|
| 1,165,894 | Negraval | Dec. 28, 1915 |
| 2,257,656 | Scully et al. | Sept. 30, 1941 |
| 2,347,193 | Hammand | Apr. 25, 1944 |
| 2,360,338 | Hammand | Oct. 17, 1944 |